Aug. 28, 1934.　　　H. R. TRAPHAGEN　　　1,971,800
FERTILIZER DISTRIBUTOR
Filed Dec. 1, 1932
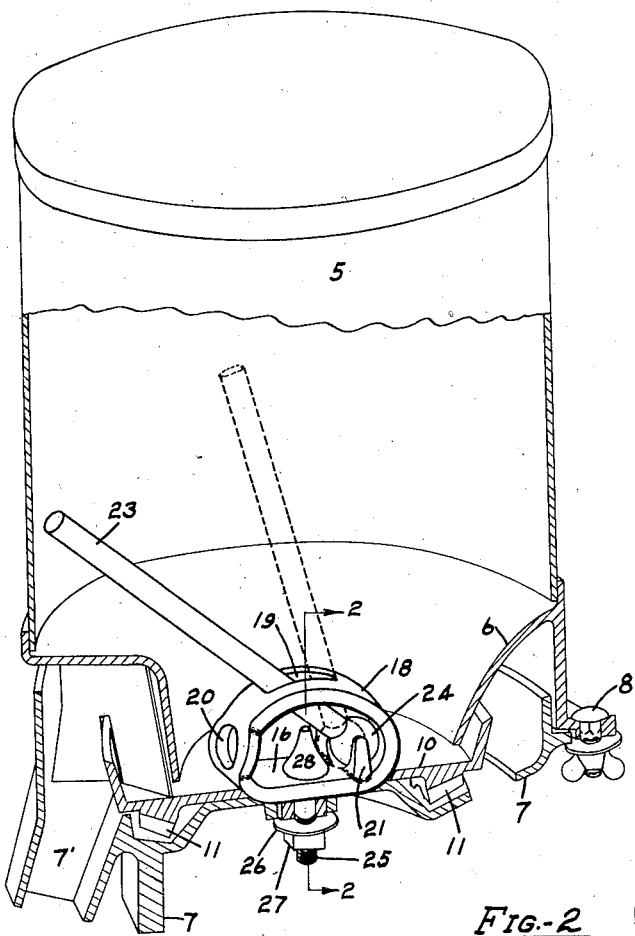
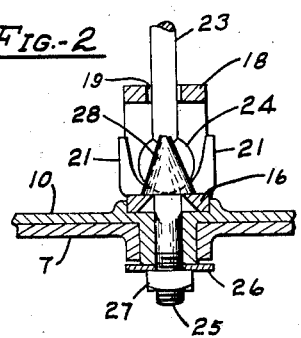
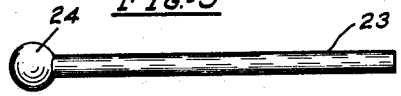
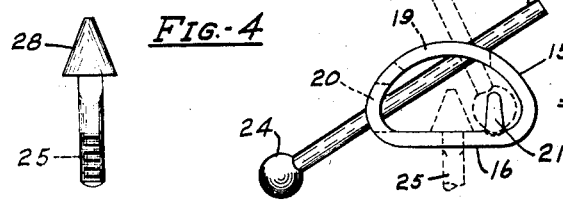
INVENTOR.
HARRY R. TRAPHAGEN
BY James A. Walsh
ATTORNEY Patented Aug. 28, 1934

1,971,800

UNITED STATES PATENT OFFICE 1,971,800

FERTILIZER DISTRIBUTOR

Harry R. Traphagen, Rockford, Ill., assignor to J. I. Case Company, Racine, Wis., a corporation Application December 1, 1932, Serial No. 645,216

3 Claims. (Cl. 259—40)

My invention relates to improvements in agitator devices adapted for use with vessels containing powdered or fine material such as fertilizer, seeds and the like, whereby I am enabled to set up a continuous rotary and irregular motion of my improvement within the container for constantly agitating the material therein so that it will become dislodged and freely flow, and which device is especially adapted for use with planters and agricultural implements equipped with fertilizer and seed distributors.

In the accompanying drawing, forming part hereof, Figure 1 is an elevation of a container partially broken away to show my improved device in perspective therein; Fig. 2, a detail section taken on the dotted line 2—2 in Fig. 1; Fig. 3, a side elevation of the agitator arm which I employ; Fig. 4, an elevation of the arm retaining bolt forming part of my improvement; and Fig. 5 is a side elevation of the device showing parts thereof in dotted lines.

In the drawing I have illustrated my device as applied to a fertilizer can assembled with a rotary plate for use with an agricultural implement, but which, as indicated, may be employed with other receptacles, and in which drawing the numeral 5 indicates a can the open end of which is mounted in a hopper 6 detachably connected to a frame 7 by bolts 8, which is a common and well known construction and arrangement. Upon said frame 7 is a rotatable plate 10 having gear teeth 11 by which it is driven from any suitable means (not shown) and which is also common.

My improved agitator device comprises a preferably ovaloid cage or frame 15 having an apertured base 16 and a curved guard 18, the latter embodying a longitudinal slot 19 and an opening 20 in its end, the base being further provided with vertical ears or stops 21, as indicated in Figs. 1 and 2. The improvement further consists in an agitator arm 23 having a spherical lower end 24, which is assembled in the cage by passing the free end thereof through the opening 20 and the slot 19 and then drawing the spherical end through the opening and positioning it between the ears 21, so that the arm will extend through the longitudinal slot 19 as indicated by the full and dotted lines, Fig. 5. In assembling the cage 15 with the rotatable plate 10 I insert a bolt 25 through the apertured base 16 and the plate 10, and secure it by the washer 26 and nut 27, the head 28 of the bolt preferably being of conical form which extends into the cage substantially as shown, and which head, the guard 18 and ears 21 confine the spherical end of the agitator arm so that it will be free to move or roll in the space therebetween but prevented from escaping therefrom.

In operation, it will be understood that the can 5 contains a supply of fine material, and that the plate 10 is caused to rotate by any suitable means, the agitator device at the same time rotating with it. While thus rotating, the arm 23, which is loosely mounted by its spherical end, travels around the interior of the receptacle through the material therein, dislodging and separating it, so that such material will constantly and freely flow downwardly and into an outlet 7' and thence through any suitable tube or distributor (not shown) to be conveyed thereby and deposited as desired, during which rotary operation said arm through its resistance against the material will be caused to deviate from its inclined position shown in full lines to varying degrees of inclination including the position indicated by dotted lines in Fig. 1, that is to say, it will roll on its rounded end and thus rock or swing through the slot 19 and gradually move back and forth therethrough according to the resistance offered by the material, and which slot is of a width to permit slight lateral play of the arm while thus moving. It will therefore be seen that the arm 23 being carried around by the rotating cage 15 has an extensive and effective range of irregular movements through the material and thus constantly agitating it for the purpose stated, and by the novel manner of assembling the parts of the device I provide a floating and automatically acting agitating implement requiring no direct driving mechanism, lubrication or personal attention, and which parts may be readily assembled and disassembled without tools or other equipment.

I claim as my invention:

1. In a powdered material distributor including a receptacle, the combination, with the receptacle, of a rotatable element, a cage secured to said element comprising a base and a guard, said guard embodying a slot in its upper side and an opening in its end, an arm adapted to pass through said opening and slot for positioning its lower end in the cage and its free end extending into the receptacle for agitating material therein when the rotatable element is actuated, and means associated with the cage for confining the lower end of the arm in the cage.

2. In an agitator device for material, a cage having a longitudinal slot in its upper side and an opening in its end, a spherically ended arm adapted to be passed through said opening and slot so that its spherical end will be positioned in the cage and a portion thereof project through the slot, and a bolt adapted to connect the cage to a support said bolt having a conical head projecting into the cage for preventing displacement of the lower end of the arm.

3. In an agitator device for fine material, a cage embodying a base and a guard said base having stops, means adjacent the stops and projecting into the cage, and an arm extending through the guard and mounted in the cage between said stops and projecting means whereby as said arm moves through said guard its lower end will be prevented from displacement.

HARRY R. TRAPHAGEN.